C. A. PRATT.
STORAGE BATTERY LOCOMOTIVE.
APPLICATION FILED JAN. 22, 1916.

1,195,723.

Patented Aug. 22, 1916.
8 SHEETS—SHEET 1.

Witnesses:

Inventor
Charles A. Pratt.
by Parker & Carter
his Attys

C. A. PRATT.
STORAGE BATTERY LOCOMOTIVE.
APPLICATION FILED JAN. 22, 1916.

1,195,723.

Patented Aug. 22, 1916.
8 SHEETS—SHEET 4.

Witnesses:

Inventor
Charles A. Pratt.
by Parker & Carter
his Attys.

UNITED STATES PATENT OFFICE.

CHARLES A. PRATT, OF CHICAGO, ILLINOIS, ASSIGNOR TO GOODMAN MANUFACTURING COMPANY, OF CHICAGO, ILLINOIS, A CORPORATION OF ILLINOIS.

STORAGE-BATTERY LOCOMOTIVE.

1,195,723.      Specification of Letters Patent.     Patented Aug. 22, 1916.

Application filed January 22, 1916. Serial No. 73,568.

*To all whom it may concern:*

Be it known that I, CHARLES A. PRATT, a citizen of the United States, residing at Chicago, in the county of Cook and State of Illinois, have invented a certain new and useful Improvement in Storage-Battery Locomotives, of which the following is a specification.

This invention relates to storage battery locomotives particularly adapted to be used in mines, and has for its object to provide a new and improved locomotive of this description.

My invention has among other objects the production of a storage battery locomotive which shall be low enough to be used in mines, and yet have sufficient storage battery space to secure the desired power to operate the motor at proper speed and efficiency throughout the working day, the storage batteries being so arranged as to leave the motors and gearing and other mechanical operating parts accessible so that they may be properly adjusted and cared for. The locomotive is also arranged so that the motors and battery are safe-guarded against over-load, the construction being such that the weight of the locomotive can be so disposed on the driving wheels and properly proportioned to the draw bar pull to secure this result. These results are secured without interfering with the easy passage of the locomotive around short curves of the track upon which the locomotive runs, such for example as are ordinarily used in mines, and without making the weight on any of the wheels which support the locomotive so great as to cause injury to the rails along which the locomotive runs, such for example, as ordinary rails used in mines, thereby producing an efficient, properly operating storage battery locomotive which may be used for any purpose desired, but which is particularly adapted to meet the peculiar conditions found in mines.

The invention is illustrated in the accompanying drawings, wherein—

Like numerals refer to like parts throughout the several figures.

Figure 1:
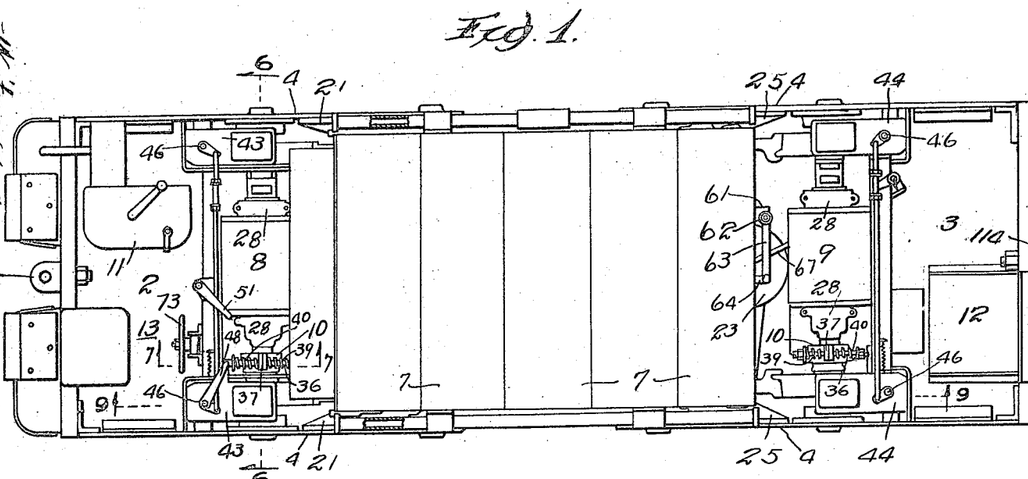
Figure 1 is a plan view of one form of locomotive embodying the invention.
Figure 2:
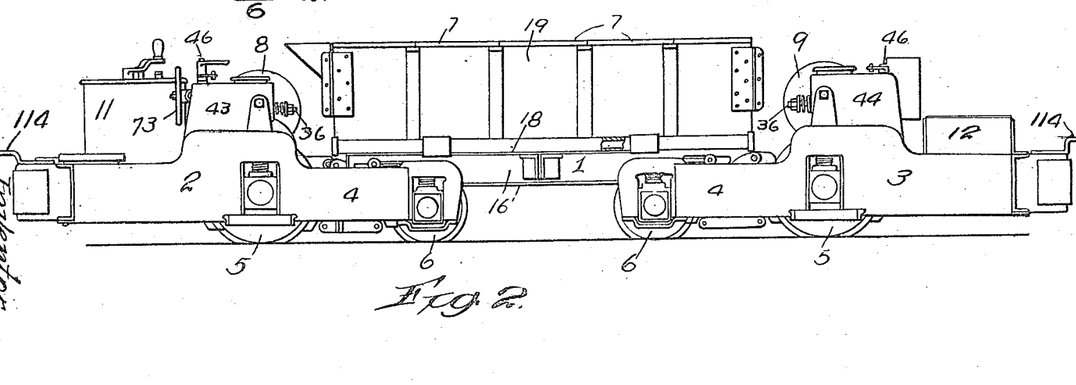
Fig. 2 is a side elevation of the locomotive shown in Fig. 1.

In carrying out my invention, I form the locomotive of three sections pivotally connected together, a central section 1 and two end sections 2 and 3, said sections being pivotally connected together. The two end sections may be similar in construction and are each provided with a suitable frame 4 mounted upon four wheels. Two of these wheels 5 are drive wheels and are made of the proper size for this purpose. The other two wheel 6 are smaller wheels, and are located under the middle section 1 of the locomotive upon which is carried the storage battery 7. It will be noted that the central or middle section only projects part way over each of the end sections, that the large drive wheels 5 are located beyond the storage battery carried by the central section, but that the small undriven wheels 6 are under the storage battery. This permits the storage battery to be brought low down near the track, its height being determined by the diameter of the small wheels and not by the diameter of the driving wheels. This construction, in addition to lowering the center of gravity, permits the use of a storage battery of sufficient size to do the work economically and efficiently, and yet a battery which is so low down that it can easily go into the restricted parts of mines where mine locomotives are required to go.

Figure 3:
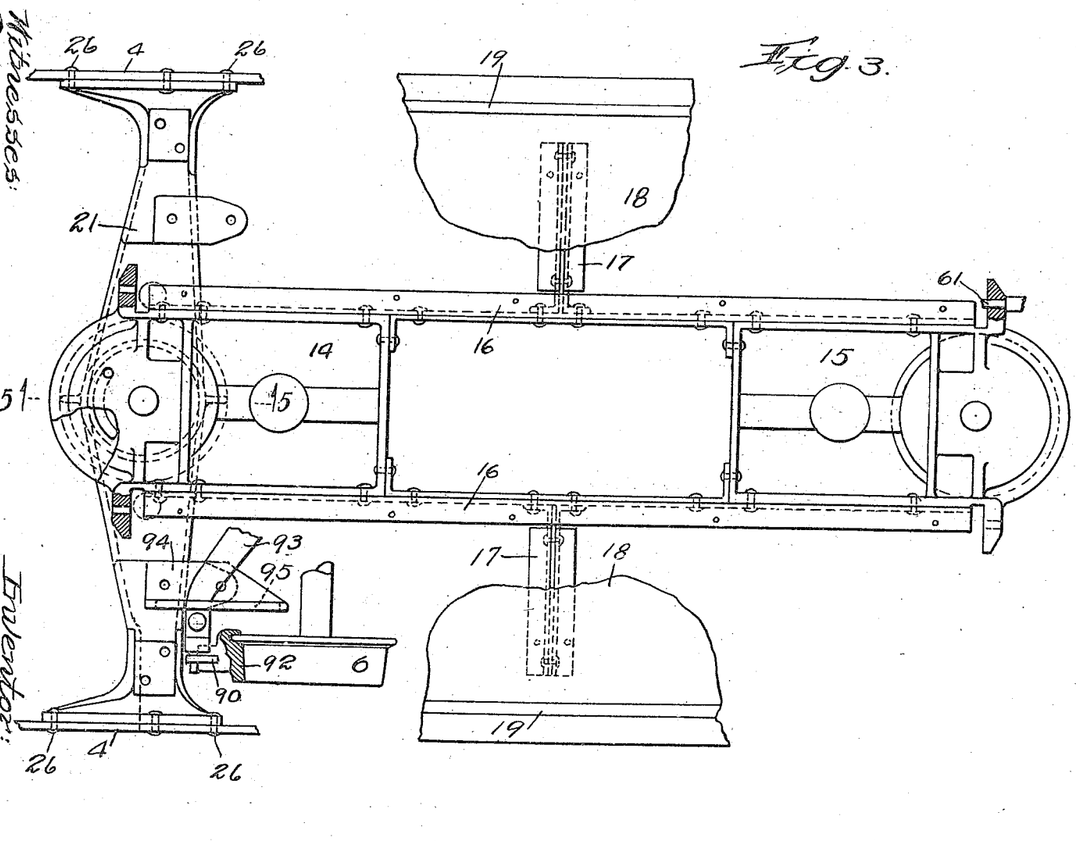
Fig. 3 is a plan view of the connecting portion of the frame of the central section of the locomotive with the storage battery and the platform carrying it, removed.

The end sections 2 and 3 are preferably each provided with electric motors 8 and 9, or only one motor may be used on one of these sections if desired. The shafts of the motors 8 and 9 are connected with their associated drive wheels 5 by suitable gearing 10. These motors are provided with suitable controllers and rheostats. In the construction shown the section 4 is provided with a controller 11 adapted to control both motors and the section 3 is provided with a rheostat 12 for both motors, the rheostat, controller and motors being properly connected. One of the sections, as for example the section 2, is provided with a space 13 for the operator of the locomotive. The middle or central section 1 is free from wheels and consists of a main frame or reach bar pivotally connected at each end with the sections 2 and 3. This main frame may be made up in any desired manner. In the construction shown, it consists of two end pieces 14 and 15, which may be the same in size, form and construction connected together by side pieces 16, which as shown, are channel irons. At the center these side pieces are provided with laterally projecting arms 17. A plate 18 is supported upon this main frame, said plate resting on the side pieces 16 and the laterally projecting arms 17. The storage batteries 7 are mounted upon this plate. The storage batteries may be surrounded by the removable walls 19 of any desired description, which form an inclosure therefor. By making the walls removable, the storage batteries may be easily placed in position and removed when desired.

Figure 7:
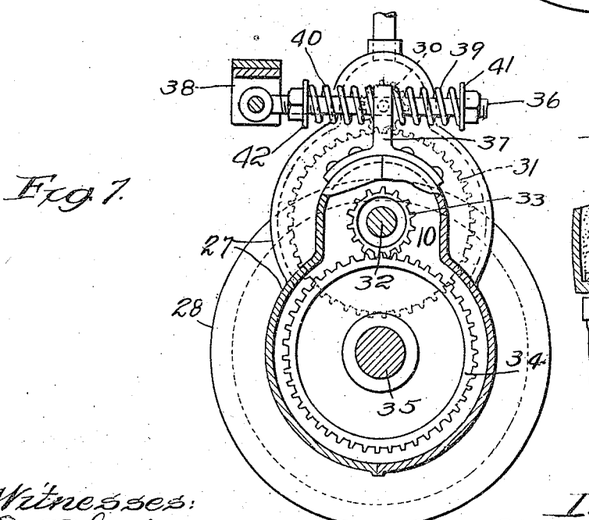
Fig. 7 is a sectional view taken on line 7—7 of Fig. 1.

The pivotal connections between the central section and the two end sections are preferably alike, and I have shown a particular form of this pivotal connection in the drawing. In this construction the end piece 14 is provided with a projecting part or pin 20 preferably integral therewith, and preferably hollow, as shown (see Fig. 5). This part 20 projects into an opening in a supporting part 21, fastened to the section 2. This supporting part has a hollow upstanding pin or part 22. The part 14 has a protecting or covering piece 23, which extends laterally so as to protect the pivotal connection. The upstanding part 22 projects up into the protecting or covering piece. The support 21 is preferably hollow. I prefer to provide a friction reducing connection between the end piece 14 and the support 21, such for example, as the ball bearings 24. The end piece 15 is similar to the end piece 14 and is similarly connected with a supporting part 25 on the end section 3. In locomotives of this kind the storage batteries are heavy, thus making the locomotives very heavy. Since the locomotives are driven by electric motors, it is essential that the weight on the driving wheels be so proportioned to the draw bar pull that when the motors are over-loaded, the wheels will slip, the tractive effort on the driving wheels being thus proportioned for this purpose, thereby preventing the motors from becoming injured or destroyed and the storage battery from being too rapidly discharged. If the weight on the driving wheels is greater than that required to develop the proper tractive effort, the wheels cannot slip when the motors are overloaded and the batteries will be exhausted with undue rapidity and the motors injured or destroyed by the excess of current. In the construction herein shown, this evil is prevented by providing an arrangement whereby the load can be so proportioned between the drive wheels 5 and the small wheels 6 as to cause the drive wheels to slip before the motors are overloaded. This result is secured by properly locating the pivotal connections between the central section and the end sections, and this result can be secured regardless of the weight of the locomotive. The motors and storage batteries are therefore completely safe-guarded. In the construction shown, the relative distribution of the weight is secured by properly locating the supports 21 and 25. These supports are preferably connected to the frames 4 of the two end sections by means of suitable connecting devices 26, which may be rivets or bolts or the like. If at any time after the locomotive is built, it is desired to vary the distribution of the weight on the driving wheels 5 and small wheels 6, this can be done by removing these connecting devices and moving the supporting parts 21 and 25 to the desired position to secure the desired distribution. The motors 8 and 9 are preferably similar and are similarly connected with their associated driving wheels 5 by similar gearing 10. This gearing is preferably located in a gear case 27 carried by the frame 28, upon which the motor is supported. In the particular construction shown, each motor shaft 29 is provided with a pinion 30, which engages a gear 31 on a shaft 32, upon which is mounted a pinion 33, which engages a gear 34 on the axle 35 carrying the drive wheels 5. Each frame 28 is free to rock upon the axle but has associated therewith an elastic holding device consisting of a rod 36 which passes through a lug 37 and which is pivoted to a fixed part 38. On each side of the lug 37 are the springs 39 and 40, the ends of the springs engaging the stops 41 and 42.

Figure 8:
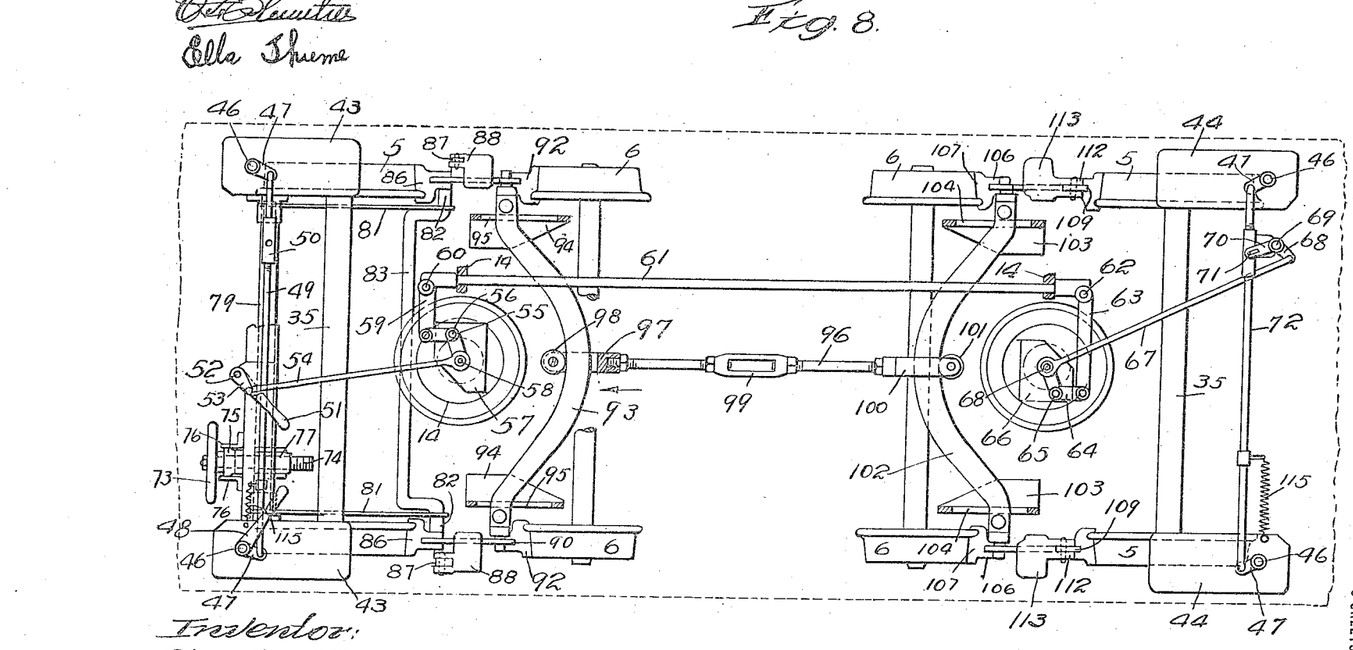
Fig. 8 is a plan view of the two end sections, showing the connections to the brake beams and sand boxes.
Figure 10:
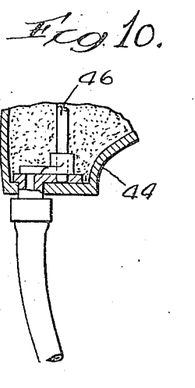
Fig. 10 is a view showing the sand box valve.

The wheels of the two end sections are provided with brakes and sanding devices adapted to be operated from one end of the locomotive, and this necessitates a particular compensating structure in view of the three section construction of the locomotive. As herein shown, there are four sand boxes. The front section is provided with the sand boxes 43 and the rear section with the sand boxes 44. Each sand box is provided with a valve controlled by a shaft 46 to which is connected a crank 47. The sand boxes are arranged so that sand may be discharged in front of one set of driving wheels when the locomotive is going in one direction and in front of the other set when the locomotive is going in the other direction, and the two sets of sand boxes are controlled from the same end of the locomotive. In the construction shown, the sand boxes 44 and 44 are controlled by means of a lever 48, which is connected with the shaft 46 of one of the sand boxes. A connecting rod 49 connects the two cranks 47 of the opposite shafts 46, so that when the lever 48 is moved, both shafts will be rotated. The rod 49 is provided with a take-up joint 50. The shafts 46 at the other end of the locomotive are controlled by a lever 51, which rocks a shaft 52 having a crank 53. Connected with this crank is a rod 54, which is connected to one end of the bell crank lever 55 pivoted at 56 to a plate 57 mounted on the front end piece 14. The pivot 58 which connects the rod 54 with the bell crank lever 55 is located directly over the pivot which connects the front section 2 of the locomotive with the central section 1 so that as the locomotive passes around curves, the bell crank lever will not be actuated. The bell crank lever 55 is connected by a link 59 to an arm 60 on a rock shaft 61, which passes to the other end section 3 of the locomotive. This rock shaft has a similar arm 62, which is connected by a link 63 with the bell crank lever 64 pivoted at 65 to a plate 66 on the other end piece of the central section.

Figure 4:
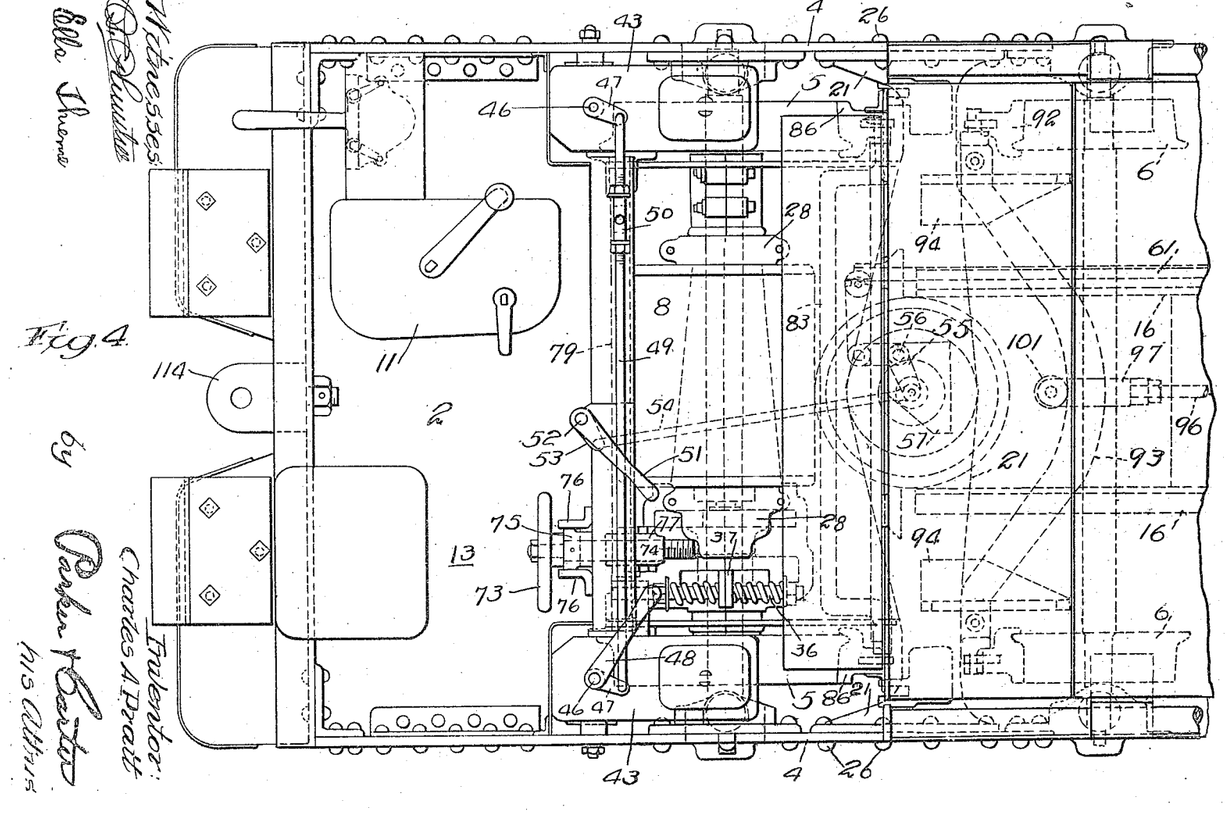
Fig. 4 is an enlarged plan view of the front motor element.
Figure 9:
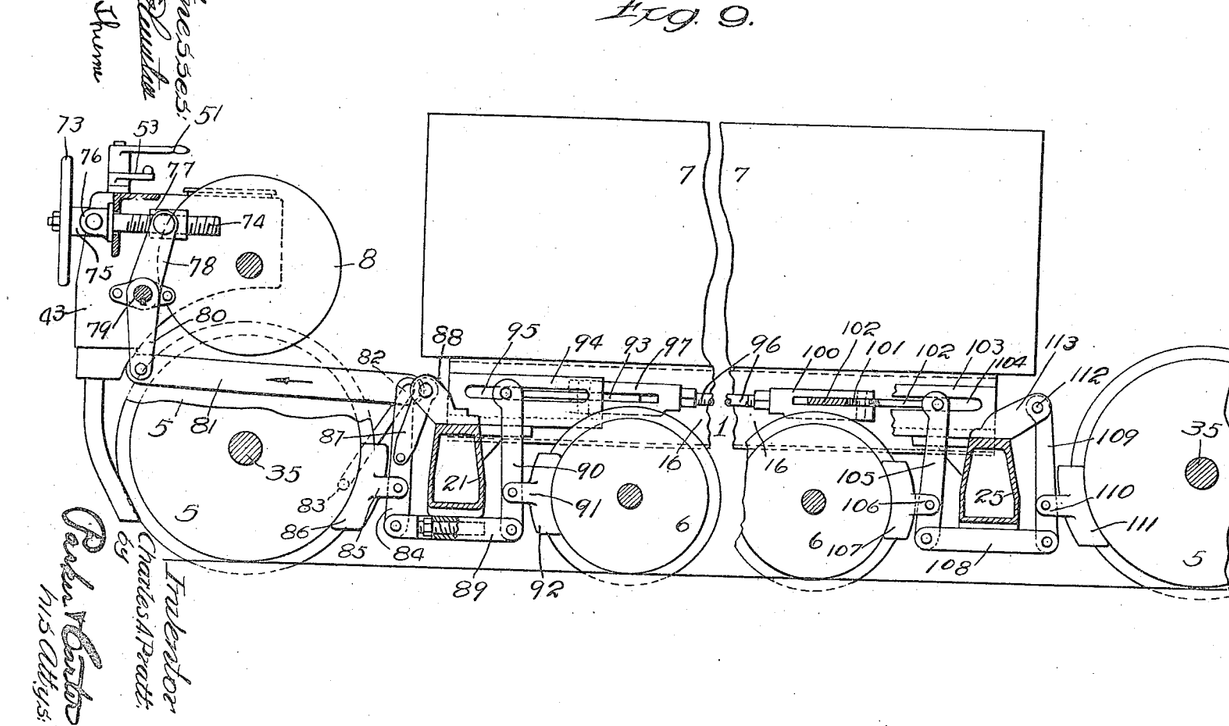
Fig. 9 is a sectional view taken on line 9—9 of Fig. 1, with parts omitted.

A rod 67 is connected by a pivot 68 with the bell crank lever, said pivot being directly over the pivotal connection between the central section 1 and the end section 3 of the locomotive. The rod 67 is connected to a crank 68 on a shaft 69 mounted on the end section. A slotted crank 70 connected with the said shaft engages a pin 71 on a rod 72, which connects with the cranks 47 on the shafts 46 of the sand boxes. It will thus be seen that by moving the lever 51, the shafts 46 on the section 3 of the locomotive will be moved to release sand in front of the wheels, and that the passing of the locomotive around curves does not in any manner interfere with this operating mechanism. The brake mechanism must also be arranged so that it can be operated at one end of the locomotive and will not be interfered with by the passing of the locomotive around curves. In the construction shown the brakes are operated by means of a hand wheel 73. This hand wheel is connected with a threaded rod 74 which passes through a pivoted socket 75 pivoted to the lugs 76 on the frame (see Figs. 4 and 9). The screw-threaded end of the rod 74 passes through a nut 77, which is pivotally connected with a crank 78 on a rock shaft 79, which extends across the locomotive. This rock shaft has at one side a crank 80 and at the opposite side a similar crank 80. These cranks are connected with the connecting pieces 81, the ends thereof being connected to the cranks 82 on the cross shaft 83. The cranks 82 are connected to the brake shoe supporting pieces 84, which are pivoted to the lugs 85 on the brake shoes 86 associated with the driving wheels 5. The brake shoes and supporting pieces are supported by the pivoted supports 87 pivotally connected with the lugs 88 on the frame. The supporting pieces 84 are connected by the adjustable links 89 with the brake shoe supporting pieces 90 pivotally connected with the lugs 91 on the brake shoes 92 associated with the wheels 6. The supporting pieces 90 are connected to the ends of the curved cross-piece 93 which are slidably mounted in the supports 94 on the end section 2, said supports being provided with slots 95 so that the cross-piece 93 may be moved back and forth to set or release the brakes. It will thus be seen that when the hand wheel 73 is rotated in one direction it will move the connecting pieces 81 in the direction of the arrow (Fig. 9). This will tend to pull the brake shoes 86 against the wheels 5 and by means of link 89 will tend to push the brake shoes 92 against the wheels 6, and to move the cross-piece 93 forward, that is, in the direction of the arrow (Fig. 8).

By holding the cross-piece against forward movement, or limiting its forward movement, it will be seen that further rotation of the wheel 73 will set the brakes 86 and 92. The motion is transmitted to the brakes at the other end of the locomotive by the actuating connection 96. This actuating connection is provided at one end with the fork 97 in which the cross-piece 93 is received, there being a roller 98 which engages the front face of the cross-piece. This actuating connection is made adjustable in any desired manner, as by the turn buckle 99. The actuating connection is provided at the other end with a similar fork 100, provided with a roller 101, which engages a similar cross-piece 102 slidably mounted on the supports 103 on the section 3, said supports having the slots 104. The ends of the cross-piece 102 are connected with the brake-shoe supporting pieces 105 which are pivoted to the lugs 106 on the brake shoes 107 and are connected by the links 108 with the brake shoe supports 109 pivoted to the lugs 110 on the brake shoes 111 associated with the driving wheels 5. The supporting pieces 109 are pivotally connected at 112 with the bracket 113 on the frame. It will thus be seen that as the cross-piece 93 is pulled forward, the actuating connection 96 also pulls the cross-piece 102 forward, and this moves the brakes 107 and 111 against their associated wheels. When the locomotive passes around curves the rollers 98 and 101 roll along the curved faces of the crosspieces 93 and 102 without interfering in any manner with the setting of the brakes, and preferably without increasing the pressure of the brakes on the wheels.

Figure 5:
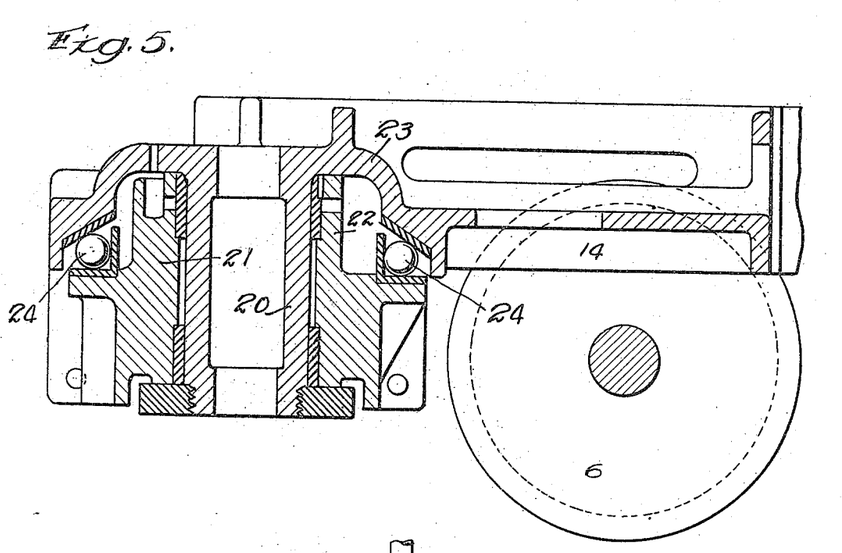
Fig. 5 is a sectional view taken on line 5—5 of Fig. 3.
Figure 6:
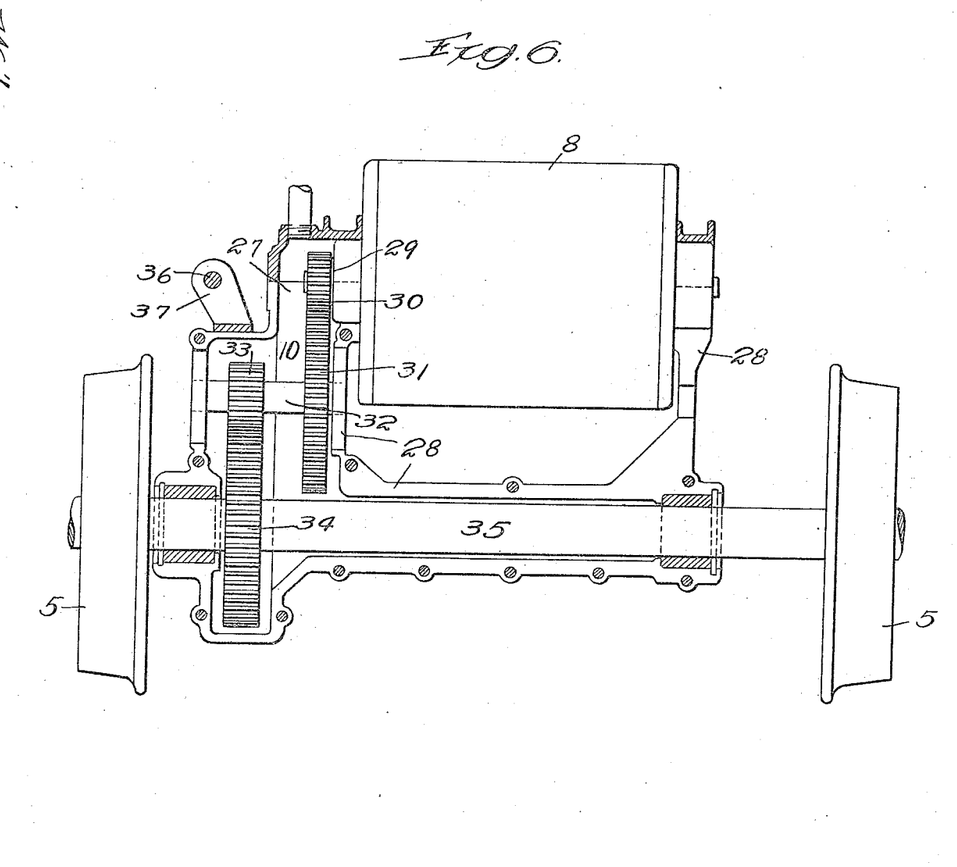
Fig. 6 is a sectional view taken on line 6—6 of Fig. 1.

The draw-bars 114, it will be noted, are on the end sections and not on the main central carrying section. It will further be noted that in this construction when the end sections bump against a car or when the brakes are set on the locomotive and the cars push forward on the end section, the strain is transmitted through the pivotal connection from one end section to the central section and thence through the pivotal connection to the other end section, and hence these pivotal connections must be strong and rigid to bear these strains. In the construction shown I have provided such pivotal connections, one form of which is illustrated in Fig. 5. It will further be noted that the springs 39 and 40 illustrated in Fig. 7 take only the gear thrust due to the fact that the motor is located directly above the axle of the driving wheels.

I prefer to arrange the sanding device so that the valves may be closed automatically when the actuating handle is released. In the construction shown, this closing is accomplished by springs 115 connected with the rods 49 and 72. I have not claimed either the brake mechanism or the sanding device in this application, the brake mechanism being claimed in a divisional application filed July 10, 1916, Serial No. 108,396, and the sanding device being claimed in a divisional application filed July 10, 1916, Serial No. 108,397.

Figure 11:
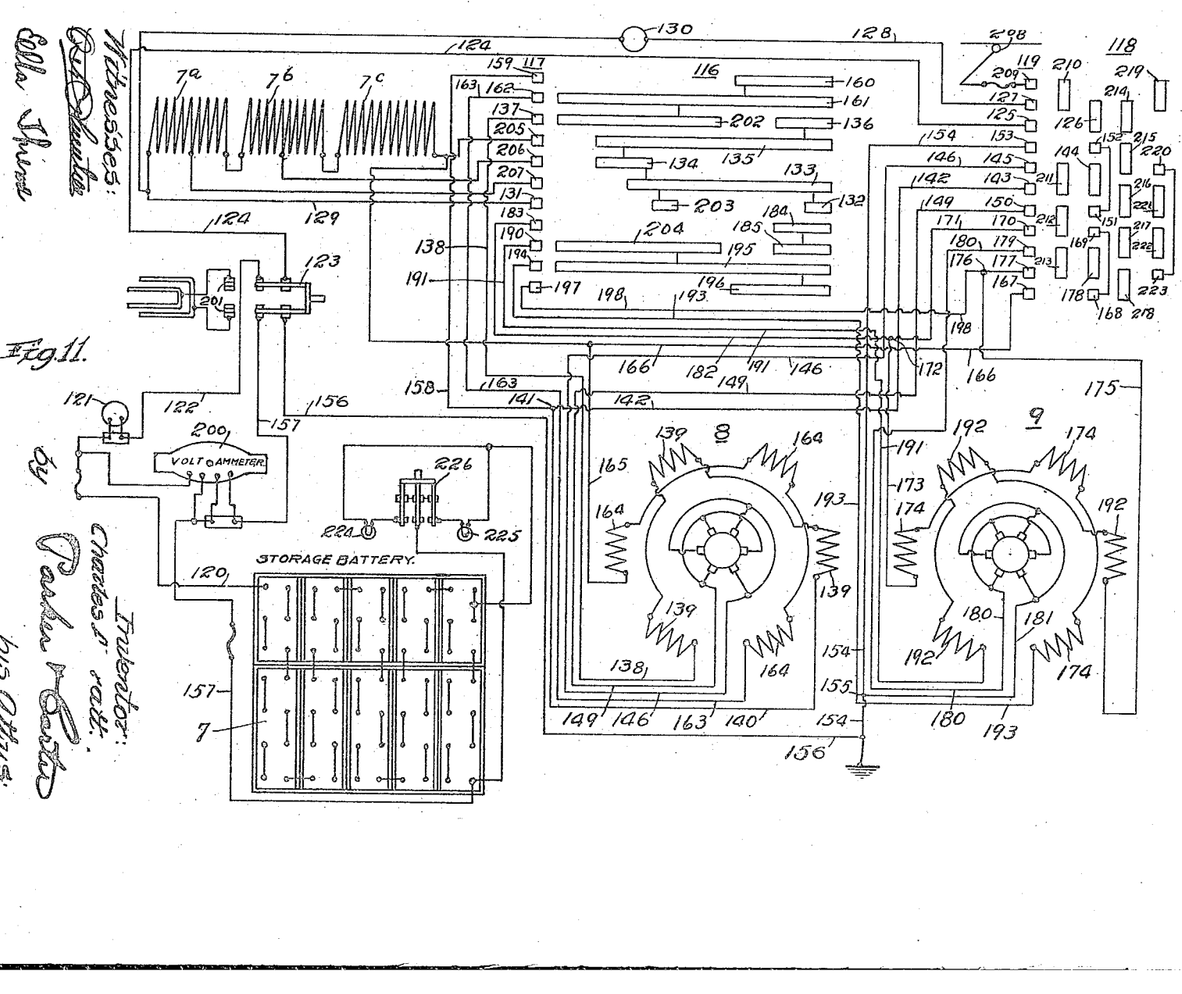
Fig. 11 is a view showing a diagram of electric circuits for the motor.

In Fig. 11 I have shown a diagrammatic view of the circuit connections of the motor, by means of which the two motors 8 and 9 are simultaneously operated in operating the locomotive. Any suitable controller may be used for controlling the motor or motors. These circuit connections as herein shown include a controller of the type illustrated in the application of Sidney W. Farnham, filed of even date herewith, wherein there is a series of resisting controlling contacts consisting of a series of movable contacts 116 and a series of stationary contacts 117, and a series of reversing contacts for reversing the motors and comprising a series of movable contacts 118 and a series of stationary contacts 119. When the motors are in operation, certain of the contacts 116 are in contact with certain of the contacts 117 and certain of the contacts 118 are in contact with certain of the contacts 119. When the contacts 116 and 118 are in the position shown in Fig. 11, the circuit through the motors is broken.

I will now trace the circuits when the motors are in operation and running in the forward direction, the motors being connected in circuit with the storage battery 7, the resistance 7$^a$, 7$^b$ and 7$^c$ being then cut out of circuit.

The current passes from the storage battery 7, by conductor 120 through the ampere hour meter 121 to conductor 122 and thence through the one pole of the switch 123, thence by conductor 124 to contact 125, thence through the contact 126, which at that time will be in contact with contact 125 and contact 127, to contact 127, thence by conductor 128 to conductor 129, the current passing through the blow-out coil 130 located in conductor 128. The current passes from conductor 129 to contact 131. The current passes from contact 131 to contact 132, which is at that time connected with contact 131, and then passes through contacts 133, 134, 135 to contact 136, and thence to contact 137, which is then in contact with contact 136, and thence by conductor 138 through the field coils 139 of the motor 8. The current then passes by conductor 140 to the point 141, where it divides, a portion of the current going through conductor 142 to contact 143 of the reversing device, then through contact 144 to contact 145, thence by conductor 146 to the armature of motor 8, and thence by conductor 149 to contact 150 of the reversing device, thence to contact 151, thence to contact 152, thence to contact 153, and thence by conductor 154 to the point 155, thence by conductor 156 to one terminal of switch 123, thence by conductor 157 back to the battery 7. The remaining portion of the current, where it divides at point 141, passes through conductor 158, to contact 159, thence through contacts 160 and 161, contact 162, thence by conductor 163, and thence through coils 164 of the field of motor 8, and thence by conductor 165 to conductor 166, to contact 167, thence through contact 168 of the reversing device, to contact 169, thence to contact 170, thence by conductor 171 to the point 172, where the current divides, one portion passing by conductor 173, through field coils 174 of motor 9, thence through conductor 193 to contact 194, thence through contacts 195 and 196 to contact 197, thence through conductor 198 to contact 177, thence through contact 178 to contact 179, thence through conductor 180 to the armature of motor 9, then through conductor 181 to the point 155 of conductor 154, and thence by conductor 156 to switch 123 and thence by conductor 157 back to the battery. The other portion of the current which divides at point 172 passes through conductor 182 to contact 183, thence through contacts 184 and 185, contact 190, thence by conductor 191 to the field coils 192 of motor 9, thence by conductor 175 to the point 176 on conductor 198, thence to contact 177, thence through contacts 178 and 179 to conductor 180, where it joins the current passing through the armature of motor 9, thence through conductor 180 to the armature of motor 9, thence through conductor 181 to the point 155 and thence by conductors 154 and 156 to switch 123 and thence by conductor 157 to the battery 7.

If desired, a volt ammeter 200 may be connected across the line between the conductors 120 and 157 and in circuit with conductor 157. When it is desired to charge the storage battery the switch 123 is moved to engage the terminals 201 of the charging circuit. The contacts 202, 203, 204, 205, 206 and 207 of the series of controlling contacts are used during the intermediate positions of the controller and prior to the time when all the resistance is cut out of circuit. I have shown in the diagram of circuits means for also taking the current from a trolley 208 if desired. In this event the current enters the trolley and passes to contact 209, and then to contact 210, and then to contact 127, the current then passing through the motors in the same manner hereinbefore described. When the trolley is used, the contacts 210, 211, 212 and 213 of the reversing device are used when the motor is going forward and the contacts 214, 215, 216, 217 and 218 when the motor is reversed. In reversing the motor, when the current comes from the battery the contacts 219, 220, 221, 222 and 223 of the reversing device are used. I have also illustrated in the drawing the two head-lights 224 and 225, which are connected in circuit with the battery, which circuit is controlled by the switch 226. It will be seen that the current through these motors is controlled by distributing or adjusting the weight on the driving wheels, which they drive, for this weight as hereinbefore set out, is properly proportioned to the draw-bar pull so that when the motors are overloaded the driving wheels will slip, thereby preventing an excessive current from passing through the motors and preventing injury to the motors and the battery, this object being secured by means of the construction herein.

I claim:

1. A storage battery locomotive comprising three sections, a central section and two end sections pivotally connected together, the central section adapted to carry the storage battery, four wheels upon which each end section is mounted, two wheels being driving wheels, the other two wheels being undriven wheels and being smaller in diameter than the driving wheels, an electric motor on each of said end sections, means for connecting said motors with said storage battery, the ends of said central section projecting over a portion of each end section and the undriven wheels thereof, one end of each end section projecting beyond the central section.

2. A storage battery locomotive comprising three sections, a central section and two end sections pivotally connected together, the central section adapted to carry the storage battery, driving wheels connected with both end sections, a motor for driving said driving wheels the driving wheels on the end sections and the motor being outside of the boundary of the central section.

3. A storage battery locomotive comprising three sections, a central section and two end sections, pivotally connected together, the central section adapted to carry the storage battery, each end section provided with four wheels, two of the wheels being driving wheels, a motor for driving said driving wheels the other two wheels being undriven, the undriven wheels projecting under the central section, the driving wheels and the motor located beyond the central section.

4. A storage battery locomotive comprising three sections, a central section and two end sections, pivotally connected together, the central section adapted to carry the storage battery, a driving motor on one of the end sections, driving wheels on said end section operatively connected to said motor, and means for adjusting the weight on said driving wheels to the horse power of the motor, whereby, when the motor is overloaded, the driving wheels will slip and permit the motor to run so as to prevent injury thereto.

5. A storage battery locomotive comprising three sections, a central section and two end sections, the central section adapted to carry the storage battery, four wheels for each end section, two of the wheels being driving wheels, a motor for driving said driving wheels the other two wheels being smaller in diameter than the driving wheels, the ends of the central section projecting over the smaller wheels of each end section, the driving wheels of the end sections and the motor being beyond the ends of the central section.

6. A storage battery locomotive comprising three sections, a central section and two end sections, the central section adapted to carry the storage battery, driving wheels on one of said end sections, a pair of undriven wheels on said latter end section, a motor on said end section, operatively connected with said driving wheels, a support on each end section, a pivotal connection between each of said supports and said central section, the support on the end section carrying the driving wheels located intermediate the driving wheels and the undriven wheels, and adapted to be fastened in said intermediate position during the construction of the locomotive so as to bring upon the driving wheels such an amount of weight that when the motor is over-loaded, the driving wheels will slip and permit the motor to run so as to prevent injury thereto.

7. A storage battery locomotive comprising three sections, a central section and two end sections pivotally connected together, driving wheels on one of said end sections, a motor on said end section operatively connected with said driving wheels, a portion of the end section carrying the driving wheels projecting beyond the central section, and means for varying the position of the pivotal connection between the central section and the end section carrying the driving wheels during the construction of the locomotive so as to regulate the amount of weight on said driving wheels.

8. A storage battery locomotive comprising three sections, a central section and two end sections, a portion of each end section projecting beyond the central section, a pivotal connection between each end section and the central section, comprising a substantially vertical projecting part on the central portion, a cross-piece on the end section having a substantially vertical opening therethrough, said projecting part projecting into said opening, whereby a strong, strain-transmitting pivotal connection is secured.

9. A storage battery locomotive comprising three sections, a central section and two end sections, a portion of each end section projecting beyond the central section, a pivotal connection between each end section and the central section, comprising a substantially vertical projecting part on the central portion, a cross-piece on the end section having a substantially vertical opening therethrough, said projecting part projecting into said opening, a covering piece integral with said projection and projecting beyond the inner walls of the opening in said cross-piece.

10. A storage battery locomotive comprising three sections, a central section and two end sections, said central section provided with a main frame consisting of two end pieces rigidly connected together, each end piece having integral therewith, a substantially vertical projecting part, a cross-piece on each end section, side frame pieces on each end section, said cross pieces extending between said side frame pieces and fastened at both ends thereto, said cross pieces having a substantially vertical opening into which one of said substantially vertical projecting parts is received, whereby a strong, strain-transmitting pivotal connection is secured between the central section and each end section.

11. A storage battery locomotive comprising a storage battery, a wheeled section having two driving wheels and two undriven wheels, an electric motor operatively connected with said driving wheels, means for connecting said electric motor in circuit with said storage battery, and means for distributing the load on said wheels due to said storage battery, between the driving wheels and the undriven wheels so that the weight on the driving wheels will be such an amount that when the motor is over-loaded the driving wheels will slip and permit the armature of the motor to rotate so as to prevent injury to the motor and a too rapid discharge of the battery.

12. A storage battery locomotive comprising three sections, a central section and two end sections pivotally connected together, the central section adapted to carry the storage battery, wheels upon which the end sections are mounted, a motor mounted upon one end section, the end of the section containing the motor projecting beyond the central section.

In testimony whereof, I affix my signature, in the presence of two witnesses, this 7th day of January, 1916.

CHARLES A. PRATT.

Witnesses:
MINNIE M. LINDENAU,
CHRISTINA DEANS.

Copies of this patent may be obtained for five cents each, by addressing the "Commissioner of Patents, Washington, D. C."